UNITED STATES PATENT OFFICE.

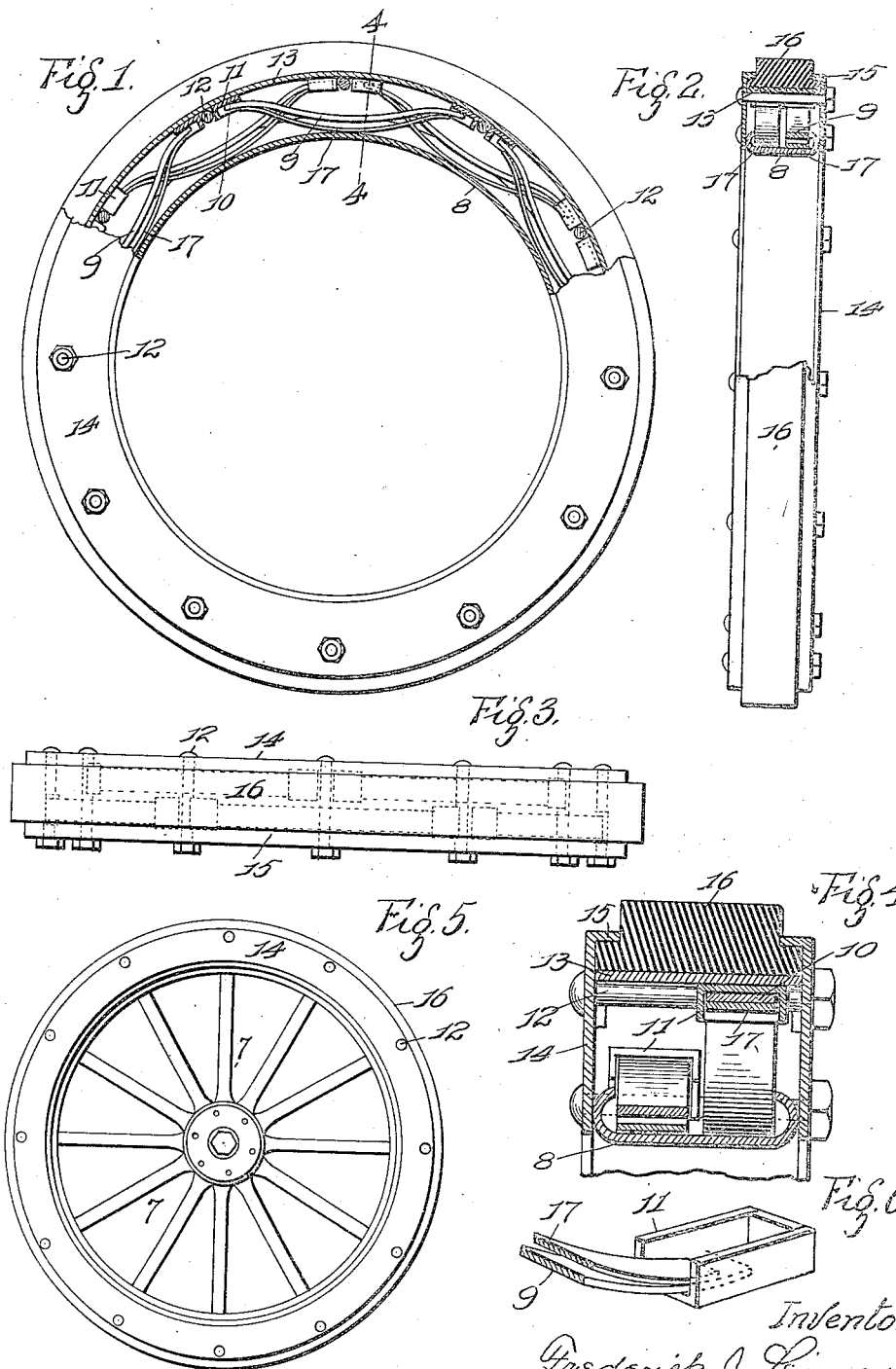

FREDERICK J. LEISSE, OF ST. LOUIS, MISSOURI.

AUTOMOBILE TIRE.

1,422,723.　　　　Specification of Letters Patent.　　Patented July 11, 1922.

Application filed July 6, 1920. Serial No. 394,054.

*To all whom it may concern:*

Be it known that I, FREDERICK J. LEISSE, a citizen of the United States, and resident of St. Louis, Missouri, have invented certain new and useful Improvements in an Automobile Tire, of which the following is a specification.

My invention relates to improvements in an automobile tire, and has for its object a spring mechanism located on the periphery of a wheel rim which will provide sufficient resiliency and to accomplish the same result as a pneumatic tire and which eliminates the inconvenience caused by the repairing of inner tubes and punctures.

A further object of my invention is to provide a wheel with a tire so constructed to provide sufficient resiliency yet dispense with the use of inner tubes and rubber casings but on the contrary, to use a tire of solid nature and of any material found most practical.

A further object of my invention is to construct a mechanism which can be applied to the rim of a wheel, this mechanism consisting of a plurality of leaf-springs so arranged and so situated as to properly distribute the pressure and weight which is exerted on the wheel and to retain the required resiliency the same as by the use of inflated tires; yet using a solid tread tire either of one piece or a plurality of sections.

Figure 1, is a side elevation of my invention with a part broken away showing the general position and arrangement of the springs.

Fig. 2, is a combined edge and sectional view of the same.

Fig. 3, is a top plan view showing the springs in dots and in a position as they would normally assume.

Fig. 4, is an enlarged detail cross-sectional view taken on the line 4—4 of Fig. 1.

Fig. 5, shows a side view of a complete wheel with my invention in position thereon.

Fig. 6, is a detail perspective view of one of the spring supporting boxes showing the relative position of the springs therein.

Referring to the drawings in detail 7 indicates an ordinary automobile wheel which comprises a hub, spokes and a rim 8. On this rim is placed my improvement which consists of a plurality of leaf-springs 9 which I will term the load springs. These springs are constructed of material of sufficient rigidity either of one leaf or a plurality as found desirable. The ends 10 of these springs are suitably bent or shaped to properly ride in supporting boxes 11, which are preferably of the construction as that shown in Fig. 6. These boxes are brought in position against bolts 12 which pass through the casing formed between the rim 8 and the outer rim 13, said boxes 11 are rigidly secured to the underside of the outer rim 13. Against these two rims and on each side thereof is placed a ring 14, through which the bolts 12 pass and which rigidly holds the rings in position forming the sides of the casing.

The rings 14 have their outer edges bent inwardly at right angles as that indicated by the numeral 15. These right angular edges extend a reasonable distance beyond the outer rim 13 forming a suitable recess and in these recesses and on the outer surface of the outer rim 13 is mounted and supported the outer tread tire 16, this tire may be constructed of any material found practical, but in practice I would prefer solid rubber constructed in sections so that in the event any one of the sections should become over worn or broken it can be removed and a new one replaced.

Against the load springs 9 I place additional springs 17, the same being attached to the rim 8 and which act as take-up springs in order to equalize the action and to hold the load springs in proper position in their boxes while the weight of the vehicle on the axle of the wheel is exerted on the load springs against which the weight is directly exerted. This weight will normally compress the springs on the under side of the wheel. This movement is taken care of by the action of the take up springs throughout the remaining series of the springs in the wheel.

These springs are arranged in staggered position and in a position as that shown in Figs. 1 and 2, thus removing as much friction as possible and to equalize and properly distribute the weight of the load.

The essential feature of my invention is to eliminate the use of pneumatic tires but to acquire approximately the same amount of resiliency by the use of leaf springs arranged in staggered relation and properly housed in a casing which is attached to a rim of an automobile wheel and to use in conjunction with this mechanism a solid tire.

Having fully described my invention what I claim is:

1. An automobile tire comprising a suitable casing adapted to be applied on the rim of a wheel, leaf springs located in the casing and arranged in staggered relation, and bearing boxes located in the casing in which the ends of the springs are seated, substantially as specified.

2. An automobile tire comprising in combination with an inner rim of a wheel, an outer rim, a pair of rings located on the sides of the rims, a tread member between said rings and on the periphery of the outer rim, bolts passed through the rings, a plurality of leaf springs located between the rims and arranged in staggered relation and bearing boxes in which the ends of the springs are seated, substantially as specified.

3. A tire of the class described comprising an outer rim, a pair of side rings, so arranged as to form a casing, bolts passed through said rings for holding the same together, a plurality of leaf springs located in the casing and bearing boxes in which the ends of the springs are seated, substantially as specified.

4. A tire of the class described comprising a plurality of leaf springs arranged in pairs of a heavy and light tension and in staggered relation, a housing supporting the same, bearing boxes located in the housing in which the ends of the springs are seated, a tread member carried by the periphery of the housing, said tire being so constructed as to be attached to the rim of an ordinary automobile wheel, substantially as specified.

In testimony whereof, I have signed my name to this specification, in presence of two subscribing witnesses.

FREDERICK J. LEISSE.

Witnesses:
  ALFRED A. EICKS,
  B. AUSTINE.